UNITED STATES PATENT OFFICE.

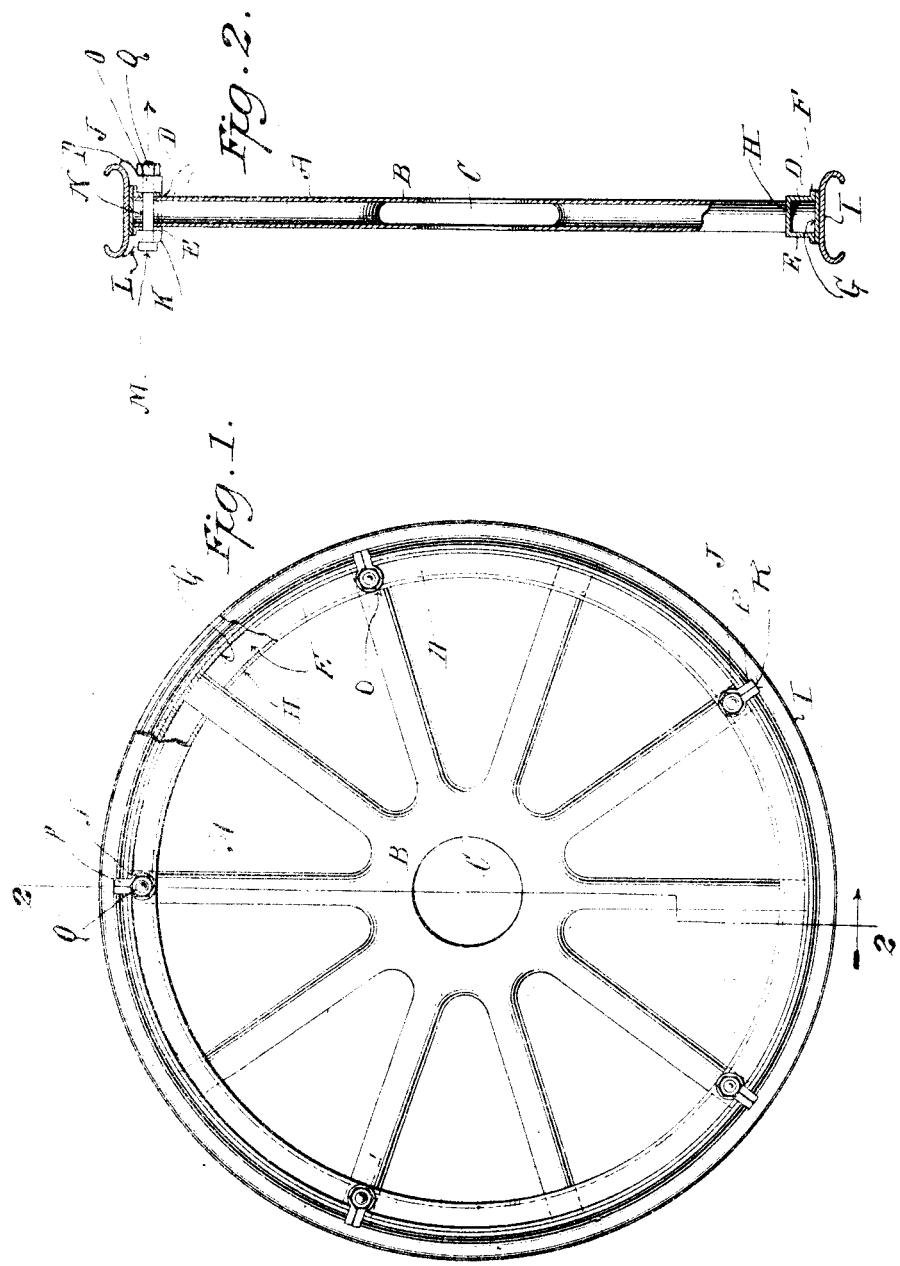

THOMAS E. MURRAY, OF NEW YORK, N. Y.

VEHICLE-WHEEL.

1,180,064. Specification of Letters Patent. Patented Apr. 18, 1916.

Application filed August 19, 1915. Serial No. 46,337.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels formed wholly of sheet metal, and consists in the construction of said wheel and of the means for rendering the rim demountable, hereinafter more particularly set forth.

In the accompanying drawings—Figure 1 is a face view of my wheel, a portion of the hollow fixed rim being broken away to show the internal construction. Fig. 2 is a section on the line 2, 2 of Fig. 1.

Similar letters of reference indicate like parts.

The spokes A are tubular and preferably formed integral with the web B at their inner ends, in which web there is a central opening C for the reception of the hub.

The fixed rim is quadrangular in cross section, having side walls D, E provided with flanges F, upon which are secured the circumferential outer wall G. The spokes A pass through openings in the inner wall H of said fixed rim and abut against said outer wall.

In order to secure the movable rim I to the fixed rim, I provide clamping devices, generally indicated at J. The fixed member K of each clamp is permanently secured to side wall E of the fixed rim and has a shoulder.

In order to secure the rim I to the fixed rim, I provide pairs of clamping devices, generally indicated at J. I may apply one pair of said clamping devices to each spoke or to alternate spokes, as shown in Fig. 1. The fixed member K of each clamp, which may be homogeneously united, as by welding, to the side wall E of the fixed rim, has a shoulder to receive the flange on said wall and the edge of wall H, and a curved extension L which bears against the rim I. The head M of a bolt N may be welded to said member K. Said bolt passes through openings in the side walls D, E and the spoke A. The protruding portion of said bolt beyond wall D passes through an opening in the movable clamping member O, which also has a shoulder to receive the flange on wall D and an extension P bearing on rim I outside of side wall D. The outer portion of bolt N is threaded to receive the clamping nut Q. The opening in member O should be large enough to allow said member to turn freely on bolt N when nut Q is loosened, and to insure this I prefer to form a gap R in said extension P communicating with the said opening.

The spokes may be homogeneously united to the fixed rim to which the movable rim is secured by setting up the nut Q. When it is desired to remove the rim I, the nut Q is loosened and the movable members O are turned on the bolts N so as to clear the movable rim—as, for example, into the position shown in dotted lines. The movable rim may then easily be slid off the fixed rim in the direction of the arrow, Fig. 2, and a new movable rim substituted, the movable clamping members O being finally returned to their original position and the nuts Q again set up.

The object of the flanges F on the side walls of the fixed rim is to furnish a wider support for the outer circumferential wall G, thus enabling that wall to be made wider than the inner or bottom wall H of the hollow rim, and so to provide for a support for a movable rim wider than said wall H.

I claim:

1. A metal vehicle wheel, comprising a hollow fixed rim quadrangular in cross section, tubular spokes entering said rim, a movable rim seated on the outer circumferential wall of said fixed rim, clamping means for said movable rim, comprising movable and fixed members respectively seated against the side walls of said fixed rim, and bolts passing through said side walls, said clamping members and said spokes.

2. A metal vehicle wheel, comprising a hollow fixed rim quadrangular in cross section having out-turned flanges on the outer edges of its side walls and its outer circumferential wall extending over and seated upon said flanges, a movable rim seated on said outer wall, clamping means for said movable rim, comprising movable and fixed members respectively seated against the side walls of said fixed rim, and means for releasably securing said movable members in place.

3. A metal vehicle wheel, comprising a hollow fixed rim quadrangular in cross section having out-turned flanges on the outer edges of its side walls and its outer circumferential wall extending over and seated upon said flanges, a movable rim seated on said outer wall, clamping means for said movable rim, comprising movable and fixed members respectively seated against said side walls of said fixed rim and recessed to receive said flanges and the edges of said movable rim, and means for releasably securing said movable members in place.

In testimony whereof I have affixed my signature in presence of two witnesses.

THOMAS E. MURRAY.

Witnesses:
   GERTRUDE T. PORTER,
   MAY G. MCGARRY.